United States Patent
Lin

(10) Patent No.: US 7,782,972 B2
(45) Date of Patent: Aug. 24, 2010

(54) APPARATUS AND METHOD FOR SELECTING ANTENNAS IN MIMO MULTI-CARRIER SYSTEM

(75) Inventor: Yu Nan Lin, Taichung (TW)

(73) Assignee: Realtek Semiconductor Corp., Science Park, Hsinchu (TW)

( * ) Notice: Subject to any disclaimer, the term of this patent is extended or adjusted under 35 U.S.C. 154(b) by 554 days.

(21) Appl. No.: 11/903,848

(22) Filed: Sep. 25, 2007

(65) Prior Publication Data

US 2008/0075190 A1    Mar. 27, 2008

(30) Foreign Application Priority Data

Sep. 26, 2006    (TW)  ............... 95135467 A

(51) Int. Cl.
*H04B 7/08* (2006.01)
(52) U.S. Cl. ................................. 375/267
(58) Field of Classification Search ............. 375/144, 375/148, 260, 267, 347; 455/464, 500, 509, 455/132, 140
See application file for complete search history.

(56) References Cited

U.S. PATENT DOCUMENTS

| | | | |
|---|---|---|---|
| 6,771,706 | B2 | 8/2004 | Ling et al. |
| 7,567,621 | B2* | 7/2009 | Sampath et al. ............. 375/267 |
| 2004/0190440 | A1 | 9/2004 | Kim et al. |
| 2005/0052991 | A1* | 3/2005 | Kadous ...................... 370/216 |
| 2006/0029236 | A1 | 2/2006 | Wu et al. |
| 2006/0131414 | A1 | 6/2006 | Nakaya et al. |
| 2006/0270360 | A1* | 11/2006 | Han et al. ..................... 455/69 |
| 2006/0285585 | A1 | 12/2006 | Sampath |
| 2007/0041457 | A1* | 2/2007 | Kadous et al. .............. 375/260 |
| 2007/0041464 | A1* | 2/2007 | Kim et al. .................... 375/267 |
| 2009/0124210 | A1* | 5/2009 | Imai et al. ..................... 455/69 |

FOREIGN PATENT DOCUMENTS

| | | |
|---|---|---|
| JP | 2006-157848 A | 6/2006 |
| JP | 2006-157848 A1 | 6/2006 |
| TW | I230525 B2 | 4/2005 |
| TW | I247500 B2 | 1/2006 |
| TW | I256219 B2 | 6/2006 |
| TW | 200709602 A1 | 3/2007 |

OTHER PUBLICATIONS

Shahab Sanayei and Aria Nosratinia: Antenna Selection in MIMO Systems; IEEE Communications Magazine Oct. 2004; pp. 68-73.

(Continued)

*Primary Examiner*—Young T. Tse
(74) *Attorney, Agent, or Firm*—IPR Works, LLC

(57) ABSTRACT

An apparatus and method for selecting antennas in a MIMO multi-carrier system is provided to effectively select a receive antenna group with better signal detection capability, thereby enhancing system performance. The apparatus includes a channel estimator and an antenna selector. The channel estimator generates a channel matrix of each MIMO channel in response to each sub-carrier. The antenna selector generates a parameter of transmission capacity for each possible receive antenna group in response to each sub-carrier, and selects a receive antenna group with an optimal overall transmission capacity according to the parameter of transmission capacity.

22 Claims, 4 Drawing Sheets

OTHER PUBLICATIONS

Manel Collados and Alexei Gorokhov:Antenna Seliection for MIMO-OFDM WLAN Systems; Personal, Indoor and Mobile Radio Communications, 2004. PIMRC 2004. 15th IEEE International Symposium on vol. 3, Issue , Sep. 5-8, 2004 pp. 1802-1806 vol. 3.

Alexei Gorokhov: Antenna Selection Algorithms for MEA Transmission Systems; Acoustics, Speech, and Signal Processing, 2002. Proceedings. (ICASSP '02). IEEE International Conference on Publication Date: 2002 vol. 3, On pp. III-2857-III-2860 vol. 3.

* cited by examiner

APPARATUS AND METHOD FOR SELECTING ANTENNAS IN MIMO MULTI-CARRIER SYSTEM

BACKGROUND OF THE INVENTION (a). Field of the Invention

The invention relates to communication systems, and more particularly to an apparatus and method for selecting antennas in a MIMO (i.e. Multiple Input Multiple Output) multi-carrier system.

(b). Description of the Prior Arts

In modern communication systems, the MIMO technology is often used in order to achieve a higher transmission rate and a wider transmission range. The MIMO technology employs multiple transmit antennas and multiple receive antennas to transmit multiple mutually independent signal streams simultaneously. Though the MIMO technology may enhance the system performance, the use of multiple receive antennas also increases the power consumption of the receiver of the system. Therefore, it becomes essential for the system to efficiently select receive antennas that work better for signal detection among all the receive antennas, so as to reduce the power consumption. When only one signal stream is transmitted at one time, receive antennas that have the strongest signal energy may be selected as sources of received signals, so as to perform signal detection. However, when multiple signal streams are transmitted simultaneously, to select the receive antennas based on the strength of received signal cannot have a significant benefit due to the fact that the signal streams interfere with each other.

For a multi-carrier system such as an OFDM (i.e. Orthogonal Frequency Division Multiplexing) system, since signals are transmitted on multiple sub-carriers simultaneously, the interference between multiple signal streams is rendered more complicated when the MIMO technology is utilized. Consequently, if receive antennas that have the strongest signal energy are directly selected for performing signal detection, the benefit is even less significant.

SUMMARY OF THE INVENTION

It is therefore one objective of the invention to provide an apparatus and method for receive antenna selection in a multi-carrier system which can efficiently select a group of receive antennas having better signal detection performance, thereby enhancing the system performance.

Another objective of the invention is to provide an apparatus and method for receive antenna selection in a multi-carrier system which can efficiently select a group of receive antennas having better signal detection performance when the multi-carrier system transmits a preamble signal in a tone-interleaved manner, thereby enhancing the system performance.

Another objective of the invention is to provide a receiver of a MIMO multi-carrier system which can utilize an antenna selection mechanism to efficiently select a group of receive antennas having better signal detection performance, thereby enhancing the system performance.

In one embodiment of the invention, a method for selecting antennas in a multi-carrier system is provided. The multi-carrier system includes a plurality of transmit antennas, a plurality of receive antennas, and a plurality of sub-carriers. The method comprises: determining some or all of the sub-carriers as referenced sub-carriers; generating a channel matrix of each of a plurality of channels in response to each of the referenced sub-carriers, wherein the channels are different and each of the channels is formed between the transmit antennas and a group of at least two of the receive antennas; generating a parameter of transmission capacity for each of the channels in response to each of the referenced sub-carriers according to the corresponding channel matrix; and selecting one of the channels and the corresponding group of at least two of the receive antennas according to the plurality of parameters of transmission capacity.

In another embodiment of the invention, an apparatus for selecting antennas in a multi-carrier system is provided. The multi-carrier system includes a plurality of transmit antennas, a plurality of receive antennas, and a plurality of sub-carriers. The apparatus comprises: a channel estimator, coupled to the receive antennas, to determine some or all of the sub-carriers as referenced sub-carriers and generate a channel matrix of each of a plurality of channels in response to each of the referenced sub-carriers, wherein each of the channels is formed between the transmit antennas and a group of at least two of the receive antennas; and an antenna selector, coupled to the channel estimator and the receive antennas, comprising: a calculation logic for generating a parameter of transmission capacity for each of the channels in response to each of the referenced sub-carriers according to the corresponding channel matrix; and a selection logic for selecting one of the channels and the corresponding group of at least two of the receive antennas according to the plurality of parameters of transmission capacity.

DETAILED DESCRIPTION OF THE INVENTION

In the embodiments of the invention described below, the OFDM system is used as an example for the multi-carrier system. However, people skilled in the art may apply the technological features of the invention to other multi-carrier systems, thus the scope of the invention is not limited to the OFDM system.

Figure 1:
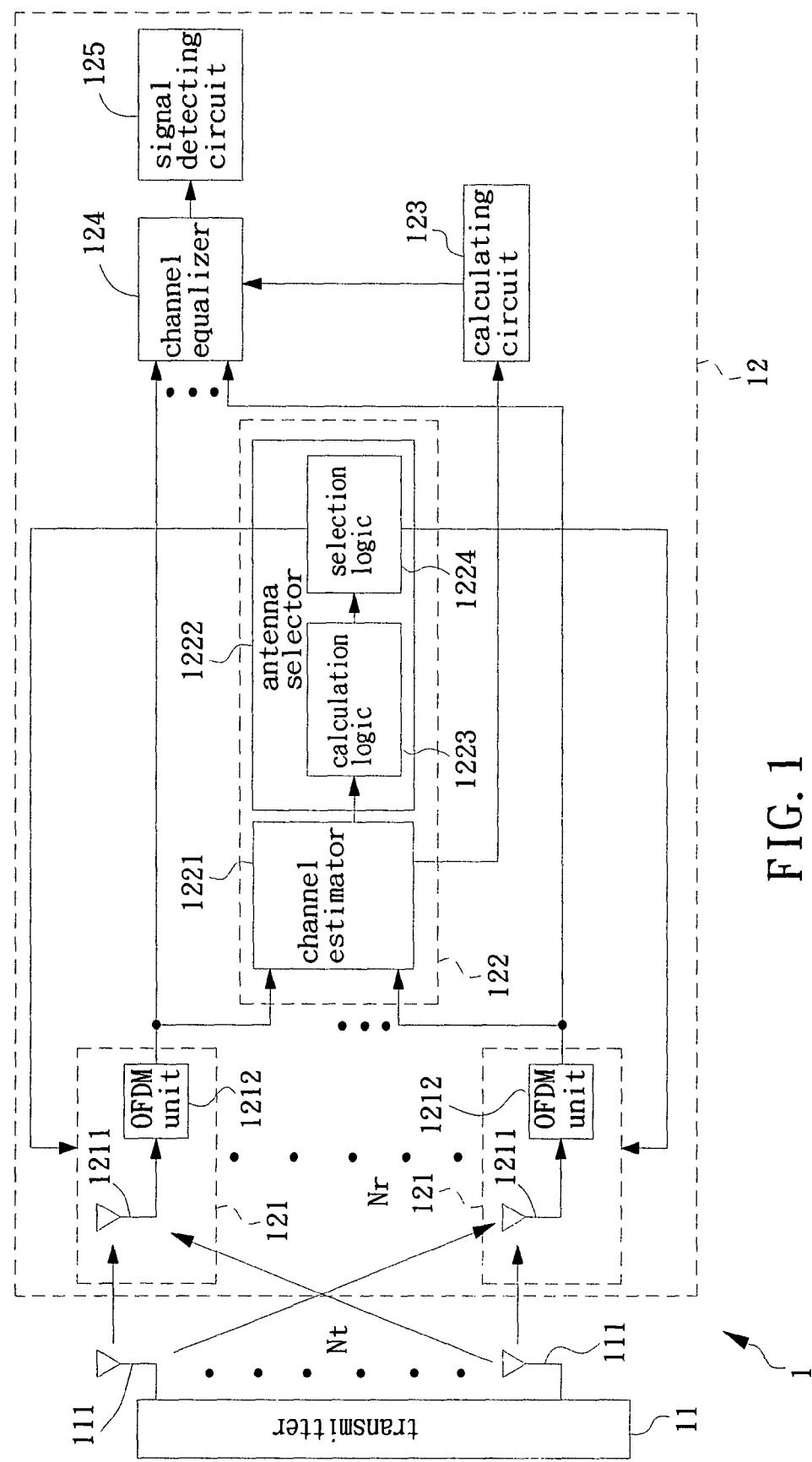
FIG. 1 is a diagram showing the architecture of a multi-carrier system according to an embodiment of the invention.

FIG. 1 is a diagram showing the architecture of a multi-carrier system according to an embodiment of the invention. In FIG. 1, the multi-carrier system 1 is a MIMO-OFDM system, and includes a transmitter 11 having $N_t$ transmit antennas 111 and a receiver 12 having $N_r$ receiving modules 121. Each receiving module 121 represents a signal reception path, and includes a receive antenna 1211 and an OFDM unit 1212. Before the multi-carrier system 1 transceives data, the transmitter 11 transmits a predetermined preamble signal, and the preamble signal received by each receive antenna 1211 is processed by the OFDM units 1212 (including demodulation from radio frequency to baseband frequency, conversion from analog domain to digital domain, OFDM decoding, etc.) before being sent to a receive antenna selecting device 122. The receive antenna selecting device 122 selects $N_a$ receiving modules 121 from the $N_r$ receiving modules 121 according to the processed preamble signal from each OFDM unit 1212, so as to receive the data subsequently transmitted by the transmitter 11. The receive antenna selecting device 122 also switches off the other receiving modules 121 that are not selected, so as to save power. On the other hand, after the receive antenna selecting device 122 has selected the $N_a$ receiving modules 121, a calculating circuit 123 calculates the coefficients for a channel equalizer 124. After the coefficients are determined, the channel equalizer 124 performs the equalization of the received data, and sends the equalized data to a signal detecting circuit 125 for detection.

Since the receive antenna selecting device 122 selects the $N_a$ ones out of the $N_r$ receiving modules 121, there are a total of $C_{N_a}^{N_r}$ ways for selecting the $N_a$ receiving modules 121, and each way of selection represents a group of receive antennas. For any group of receive antennas S, a MIMO channel is formed between the group S and the $N_t$ transmit antennas 111 (thus $C_{N_a}^{N_r}$ MIMO channels in total can be formed). If the multi-carrier system 1 has n sub-carriers, the channel matrix of the MIMO channel in response to the $k^{th}$ sub-carrier (k=0~n-1) is $$H_S(k) = \begin{bmatrix} h_{S_1,1} & \cdots & h_{S_1,N_t} \\ \vdots & \ddots & \vdots \\ h_{S_{N_a},1} & \cdots & h_{S_{N_a},N_t} \end{bmatrix} \quad \text{Eq (1-1)}$$

In Eq (1-1), each matrix element represents the channel response for the $k^{th}$ sub-carrier between each transmit antenna 111 and each receive antennas 1211 of the group S. For example, $h_{S_1,N_t}$ represents the channel response for the $k^{th}$ sub-carrier between the $1^{st}$ receive antenna 1211 of the group S and the $N_t^{th}$ transmit antenna 111.

Based on the channel matrix in Eq (1-1), an optimal transmission capacity for the MIMO channel in response to the $k^{th}$ sub-carrier is $$C(k) = \log \det(I + \gamma H'_S(k) H_S(k)) \quad \text{Eq (1-2)}$$

Wherein I is an identity matrix, γ is a signal-to-noise ratio (SNR) at the receiving side, $H'_S(k)$ is a Hermitian matrix of $H_S(k)$. Eq (1-2) is well known to people skilled in the art, and will not be further described here. For further explanation about Eq (1-2), please refer to S. Sanayei and A. Nosratinia, "Antenna selection in MIMO systems," *IEEE Communications Magazine*, pp. 68-73, October 2004.

In order to obtain optimal transceiving performance of the multi-carrier system 1, a group of receive antennas which can achieve the optimal transmission capacity should be selected. Eq (1-2) shows the optimal transmission capacity of a MIMO channel (and its corresponding group of receive antennas) in a single sub-carrier, and since the multi-carrier system 1 utilizes n sub-carriers to transceive data simultaneously, it is inadequate to consider only a single sub-carrier when selecting the group of receive antennas. Therefore, the receive antenna selecting device 122 considers the respective transmission capacity that each group of receive antennas can achieve in response to a plurality of referenced ones of the n sub-carriers, so as to select a group of receive antennas having an optimal overall transmission capacity. In one embodiment, the receive antenna selecting device 122 considers all the n sub-carriers, i.e. the referenced sub-carriers are the n sub-carriers. In another embodiment, the receive antenna selecting device 122 considers a part of the n sub-carriers, i.e. the referenced sub-carriers are a subset of the n sub-carriers, so as to select an optimal group of receive antennas. For example, because adjacent sub-carriers have similar channel response and transmission capacity, it is feasible to consider one of every m (m>1) adjacent sub-carriers in order to reduce the calculation loading. For instance, if m=2, only odd or even sub-carriers are considered; if m=3, only $0^{th}$, $3^{rd}$, $6^{th}$ . . . sub-carriers, or $1^{st}$, $4^{th}$, $7^{th}$ . . . sub-carriers, or $2^{nd}$, $5^{th}$, $8^{th}$ . . . sub-carriers are considered. A maximum allowable value of m can be adjusted according to channel characteristics.

The receive antenna selecting device 122 comprises a channel estimator 1221 and an antenna selector 1222. The channel estimator 1221 is coupled to the $N_r$ OFDM units 1212, and generates a channel matrix, as shown in Eq (1-1), of each MIMO channel in response to each referenced sub-carrier according to the preamble signal processed by the OFDM unit 1212. The antenna selector 1222 is coupled to the channel estimator 1221 and the $N_r$ receiving modules 121, and comprises a calculation logic 1223 and a selection logic 1224. The calculation logic 1223 generates a parameter of transmission capacity for each MIMO channel (and its corresponding group of receive antennas) in response to each referenced sub-carrier according to the corresponding channel matrix generated by the channel estimator 1221. The parameter of transmission capacity corresponds to a transmission capacity of the MIMO channel in response to the referenced sub-carrier (for example, the optimal transmission capacity shown in Eq (1-2)), and can be used to indicate the scale of the transmission capacity of the MIMO channel in response to the referenced sub-carrier. Assume that the group of receive antennas corresponding to the MIMO channel is S and the referenced sub-carrier is $k^{th}$ sub-carrier, the parameters of transmission capacity in various forms can be generated as follows according to Eq (1-2): (1) The determinant $\det(I+\gamma H'_S(k)H_S(k))$ in Eq (1-2) is directly used as the parameter of transmission capacity, though the required amount of calculation is larger. (2) When the signal-to-noise ratio γ at the receiving side is larger, effects of noises can be neglected, and thus a simplified determinant $\det(H'_S(k)H_S(k))$ can be used as the parameter of transmission capacity to reduce the amount of calculation. (3) When the number $N_t$ of the transmit antennas 111 is identical to the number $N_a$ of the receive antennas 1211 in the group S, a more simplified determinant $\det(H_S(k))$ can be used as the parameter of transmission capacity to substantially reduce the amount of calculation. It should be noted that the form of the parameter of transmission capacity is not limited, as long as the parameter of transmission capacity can be used to indicate the scale of the transmission capacity of a MIMO channel in response to a referenced sub-carrier.

Next, according to the parameter of transmission capacity for each group of receive antennas in response to each referenced sub-carrier, the selection logic 1224 selects a first group from the $C_{N_a}^{N_r}$ groups of receive antennas, and enables each receive antenna 1211 in the first group and the associated receiving module 121. In one embodiment, the selection logic 1224 selects the first group of receive antennas according to a sum of the parameter of transmission capacity for each group of receive antennas in response to each referenced sub-carrier. For instance, the group with a maximum sum of the parameter of transmission capacity of each referenced sub-carrier can be selected as the first group. In a first preferred embodiment, the selection logic 1224 selects the first group of receive antennas according to a sum of the reciprocal of the parameter of transmission capacity for each group of receive antennas in response to each referenced sub-carrier. For example, the group with a minimum sum of the reciprocal of the parameter of transmission capacity of each referenced sub-carrier can be selected as the first group. In the first preferred embodiment, the influence weight of the sub-carriers with worse channel response can be increased, thereby significantly improving the performance in the condition of a larger channel coding rate (i.e. worse coding protection).

In a second preferred embodiment, if the $N_t$ transmit antennas 111 of the multi-carrier system 1 transmit a preamble signal having a plurality of preamble sequences at the n sub-carriers in a tone-interleaved manner, the channel estimator 1221 begins to generate a channel matrix corresponding to each MIMO channel in response to each referenced sub-carrier, i.e. begins the selection of the receive antennas 1211, when the receive antennas 1211 receive the first preamble sequence at each sub-carrier. Further, in the corresponding channel matrix, the matrix element corresponding to each receive antenna 1211 in the group of receive antennas of each MIMO channel is generated according to the first preamble sequence received by the receive antenna 1211 at the referenced sub-carrier or other sub-carrier neighboring to the referenced sub-carrier. In the second preferred embodiment, each preamble sequence is an OFDM symbol that carries a training sequence, and the tone-interleaved transmission means that different transmit antennas 111 transmit the preamble sequences at different sub-carriers at the same time. As a result, when receiving the preamble signal, the receiver 12 can distinguish the preamble sequences transmitted from different transmit antennas 111 according to positions of the sub-carriers. In addition, the calculating circuit 123 will calculate the coefficients of the channel equalizer 124 after the selection logic 1224 enables each receive antenna 1211 in the first group of receive antennas. Since the selection of the receive antennas 1211 begins when the first preamble sequence is received, the calculating circuit 123 can complete the calculation of the coefficients of the channel equalizer 124 before all the preamble sequences are received. Since the preamble sequences are usually followed by the actual data, the channel equalizer 124 can equalize the data in time by setting the coefficients before the reception of the preamble sequences is over. Also, the signal detecting circuit 125 can detect the data in time without causing additional detection delays, thereby enhancing the system performance.

Figure 2A:
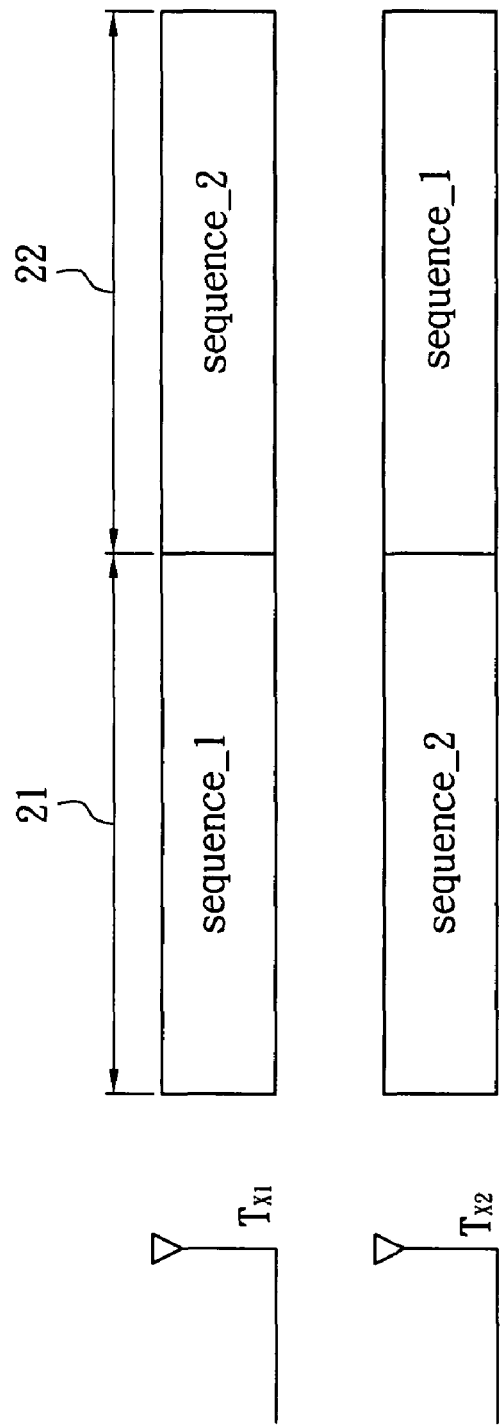
FIG. 2A shows an example of transmitting the preamble signal in a tone-interleaved manner by two transmit antennas.
Figure 2B:
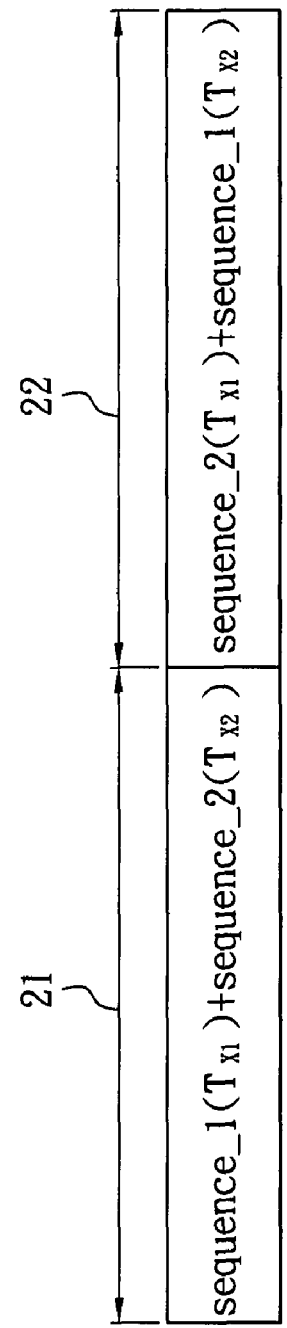
FIG. 2B shows the preamble signal received by each receive antenna under the tone-interleaved transmission in FIG. 2A.

The second preferred embodiment is further illustrated with respect to FIGS. 2A, 2B, 3A and 3B, in which either two or three transmit antennas 111 are employed. FIG. 2A shows an example of transmitting the preamble signal in the tone-interleaved manner by two transmit antennas 111 (denoted as Tx1 and Tx2). The preamble signal includes sequence_1 and sequence_2, which represent the preamble sequence transmitted at even sub-carriers and odd sub-carriers respectively. On the other hand, the preamble signal received by each receive antenna 1211 are shown in FIG. 2B, where in the first preamble sequence period 21, each receive antenna 1211 receives the preamble sequences transmitted at the even sub-carriers by Tx1 and those transmitted at the odd sub-carriers by Tx2; in the second preamble sequence period 22, each receive antenna 1211 receives the preamble sequences transmitted at the odd sub-carriers by Tx1 and those transmitted at the even sub-carriers by Tx2. As described previously, since adjacent sub-carriers have similar channel response and transmission capacity, it is feasible to consider only either odd or even sub-carriers when selecting the group of receive antennas. Therefore, in the case that two transmit antennas 111 are used, if only even sub-carriers are considered (i.e. the even sub-carriers are used as the referenced sub-carriers), then when the channel estimator 1221 is to generate the channel matrix corresponding to each MIMO channel in response an even sub-carrier according to the first preamble sequence received from each sub-carrier, the matrix element corresponding to each receive antenna 1211 in the group of receive antennas of the MIMO channel is generated according to the first preamble sequence received by the receive antenna 1211 at the even sub-carrier or the odd sub-carrier adjacent to the even sub-carrier. In other words, the channel matrix in Eq (1-1) can be expressed as $$H_S(2k) = \begin{bmatrix} y_{S_1,1}(2k) & y_{S_1,2}(2k+1) \\ \vdots & \vdots \\ y_{S_{N_a},1}(2k) & y_{S_{N_a},2}(2k+1) \end{bmatrix} \quad \text{Eq (1-3)}$$

In Eq (1-3), $y_{Sm,1}(2k)$ is the channel response of the $m^{th}$ (m=1~$N_a$) receive antenna 1211 of the group S for the 2 $k^{th}$ sub-carrier, and is compensated by the first preamble sequence (i.e. sequence_1) received by the $m^{th}$ receive antenna 1211 at the 2 $k^{th}$ sub-carrier. $y_{Sm,2}(2k+1)$ is the channel response of the $m^{th}$ receive antenna 1211 for the $(2k+1)^{th}$ sub-carrier, and is compensated by the first preamble sequence (i.e. sequence_2) received by the $m^{th}$ receive antenna 1211 at the $(2k+1)^{th}$ sub-carrier.

Figures 3A, 3B:
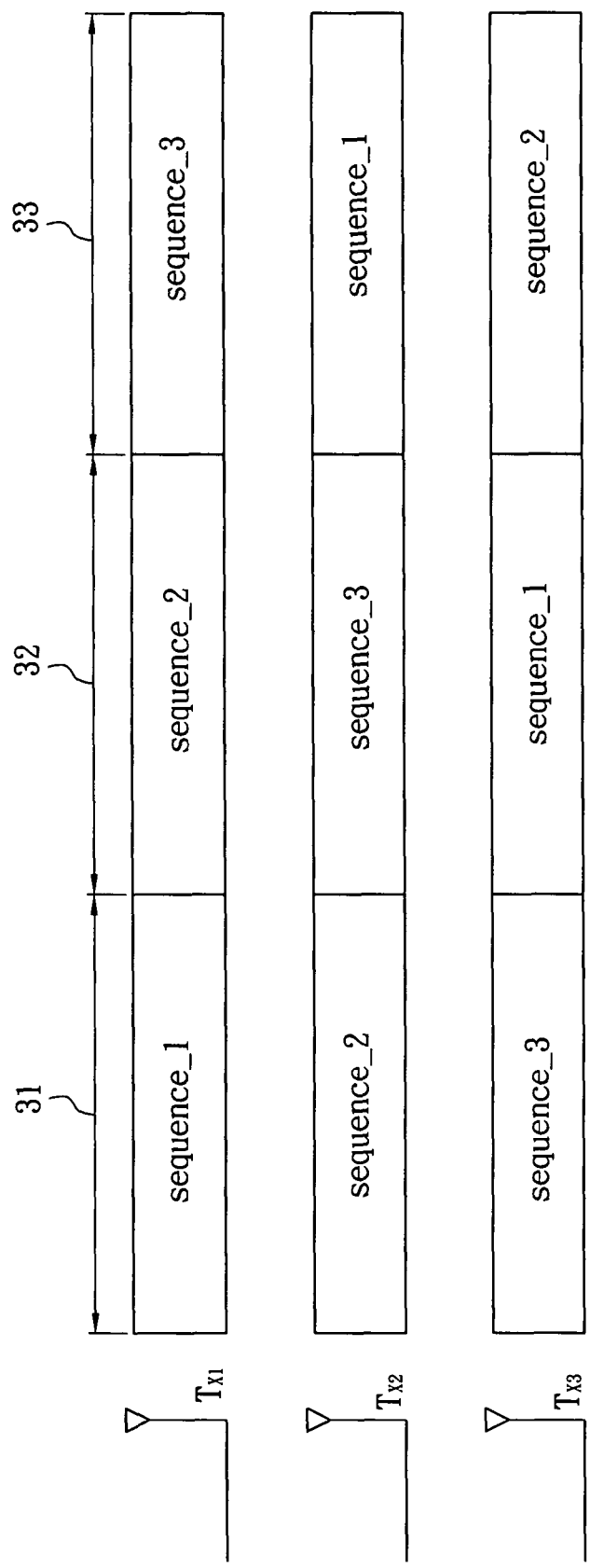
FIG. 3A shows an example of transmitting the preamble signal in the tone-interleaved manner by three transmit antennas.
FIG. 3B shows the preamble signal received by each receive antenna under the tone-interleaved transmission in FIG. 3A.

FIG. 3A shows an example of transmitting the preamble signal in the tone-interleaved manner by three transmit antennas 111 (denoted as Tx1, Tx2 and Tx3), wherein sequence_1, sequence_2, and sequence_3 represent the preamble sequences transmitted at the 3 $k^{th}$, $(3k+1)^{th}$ and $(3k+2)^{th}$ sub-carriers, respectively. As shown in FIG. 3A, within the same preamble sequence period 31, 32, or 33, Tx1, Tx2, and Tx3 transmit different preamble sequences respectively. On the other hand, the signal received by each receive antenna 1211 are shown in FIG. 3B. In this example, the channel matrix corresponding to each MIMO channel in response to each referenced sub-carrier can be generated by using the preamble sequence received at each sub-carrier during the first preamble sequence period 31. The referenced sub-carrier can be the 3 $k^{th}$, $(3k+1)^{th}$, or $(3k+2)^{th}$ sub-carrier. Here the 3 $k^{th}$ sub-carrier is used as an example. Therefore, the channel matrix in Eq (1-1) can be expressed as:

$$H_S(3k) = \begin{bmatrix} y_{S_1,1}(3k) & y_{S_1,2}(3k+1) & y_{S_1,3}(3k+2) \\ \vdots & \vdots & \vdots \\ y_{S_{N_a},1}(3k) & y_{S_{N_a},2}(3k+1) & y_{S_{N_a},3}(3k+1) \end{bmatrix} \quad \text{Eq (1-4)}$$

In Eq (1-4), $y_{Sm,1}(3k)$ is the channel response of the $m^{th}$ (m=1~$N_a$) receive antenna 1211 of the group S for the 3 $k^{th}$ sub-carrier, and is compensated by the first preamble sequence (i.e. sequence_1) received by the $m^{th}$ receive antenna 1211 at the 3 $k^{th}$ sub-carrier; $y_{Sm,2}(3k+1)$ is the channel response of the $m^{th}$ receive antenna 1211 for the $(3k+1)^{th}$ sub-carrier, and is compensated by the first preamble sequence (i.e. sequence_2) received by the $m^{th}$ receive antenna 1211 at the $(3k+1)^{th}$ sub-carrier; $y_{Sm,3}(3k+1)$ is the channel response of the $m^{th}$ receive antenna 1211 for the $(3k+2)^{th}$ sub-carrier, and is compensated by the first preamble sequence (i.e. sequence_3) received by the $m^{th}$ receive antenna 1211 at the $(3k+2)^{th}$ sub-carrier.

Figure 4:
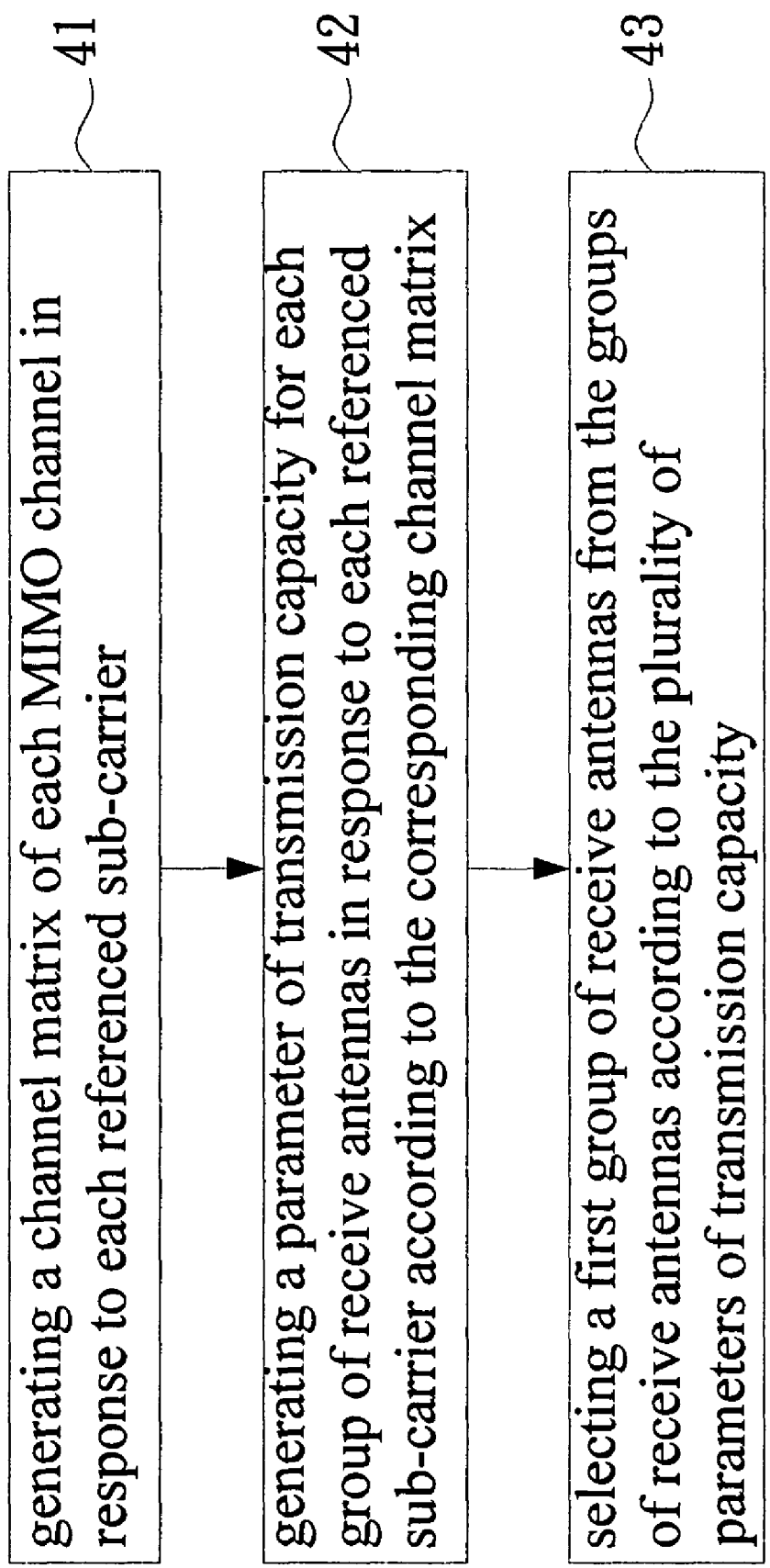
FIG. 4 is a flow chart of a method for receive antenna selection in the multi-carrier system according to an embodiment of the invention.

FIG. 4 is a flow chart of a method for receive antenna selection in the multi-carrier system according to an embodiment of the invention. The multi-carrier system comprises a plurality of transmit antennas, a plurality of receive antennas, and a plurality of sub-carriers which include a plurality of referenced sub-carriers. As shown in FIG. 4, the method includes the following steps:

Step 41: generating a channel matrix of each of a plurality of MIMO channels in response to each referenced sub-carrier, wherein the MIMO channels are formed between the transmit antennas and each of a plurality of groups of receive antennas;

Step 42: generating a parameter of transmission capacity for each group of receive antennas in response to each referenced sub-carrier according to the corresponding channel matrix; and Step 43: selecting a first group of receive antennas from the groups of receive antennas according to the plurality of parameters of transmission capacity.

In the step 41, each group of receive antennas includes at least two of the receive antennas. In the step 42, the parameter of transmission capacity for a group of receive antennas is used to indicate the scale of a transmission capacity of the MIMO channel corresponding to the group of receive antennas in response to the referenced sub-carrier, and the form of the parameter of transmission capacity is not limited.

In the step 43, the first group of receive antennas is selected according to a sum of the parameter of transmission capacity for each group of receive antennas in response to each referenced sub-carrier. For instance, the group with a maximum sum of the parameter of transmission capacity of each referenced sub-carrier can be selected as the first group. In a preferred embodiment, the step 43 selects the first group of receive antennas according to a sum of the reciprocal of the parameter of transmission capacity for each group of receive antennas in response to each referenced sub-carrier. For example, the group with a minimum sum of the reciprocal of the parameter of transmission capacity of each referenced sub-carrier can be selected as the first group.

In one embodiment, the referenced sub-carriers are all the sub-carriers. In another embodiment, the referenced sub-carriers are a subset of the sub-carriers. For example, the referenced sub-carriers includes one of every m (m>1) adjacent ones of the sub-carriers.

In a preferred embodiment, if the transmit antennas transmit a plurality of preamble sequences at the sub-carriers in a tone-interleaved manner, the flow is started when the receive antennas receive the first preamble sequence at each of the sub-carriers. In the channel matrix generated in the step 41, the matrix element corresponding to each receive antenna in a group of receive antennas of the MIMO channel is generated according to the first preamble sequence received by the receive antenna at the referenced sub-carrier or other sub-carrier neighboring to the referenced sub-carrier.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for selecting antennas in a multi-carrier system which comprises a plurality of transmit antennas, a plurality of receive antennas, and a plurality of sub-carriers, the method comprising:

determining some or all of the sub-carriers as referenced sub-carriers;

generating a channel matrix of each of a plurality of channels in response to each of the referenced sub-carriers, wherein the channels are different and each of the channels is formed between the transmit antennas and a group of at least two of the receive antennas;

generating a parameter of transmission capacity for each of the channels in response to each of the referenced sub-carriers according to the corresponding channel matrix; and selecting one of the channels and the corresponding group of at least two of the receive antennas according to the plurality of parameters of transmission capacity.

2. The method of claim 1, wherein the parameter of transmission capacity is generated according to a determinant det(H'H), wherein H is the channel matrix of the channel in response to the referenced sub-carrier, and H' is a Hermitian matrix of H.

3. The method of claim 2, wherein the channel is selected according to a sum of the parameter of transmission capacity for each of the channels in response to each of the referenced sub-carriers.

4. The method of claim 3, wherein the channel with a maximum sum of the parameter of transmission capacity of each of the referenced sub-carriers is selected.

5. The method of claim 2, wherein the channel is selected according to a sum of a reciprocal of the parameter of transmission capacity for each of the channels in response to each of the referenced sub-carriers.

6. The method of claim 5, wherein the channel with a minimum sum of a reciprocal of the parameter of transmission capacity of each of the referenced sub-carriers is selected.

7. The method of claim 1, wherein the parameter of transmission capacity is generated according to a determinant det(H) when a number of the transmit antennas is identical to a number of the receive antennas in the group of at least two of the receive antennas, wherein H is the channel matrix of the channel in response to the referenced sub-carrier.

8. The method of claim 1, wherein the referenced sub-carriers include one of every a plurality of adjacent ones of the sub-carriers.

9. The method of claim 1, wherein if the transmit antennas transmit a plurality of preamble sequences at the sub-carriers in a tone-interleaved manner, the channel matrix generating step starts to generate the channel matrix when the receive antennas receive a first preamble sequence at each of the sub-carriers.

10. The method of claim 9, wherein a matrix element corresponding to each receive antenna in the corresponding group of at least two of the receive antennas of each of the channels is generated according to the first preamble sequence received by the receive antenna at the referenced sub-carrier or other sub-carrier neighboring to the referenced sub-carrier.

11. The method of claim 1, wherein the multi-carrier system is an Orthogonal Frequency Division Multiplexing (OFDM) system.

12. An apparatus for selecting antennas in a multi-carrier system which comprises a plurality of transmit antennas, a plurality of receive antennas, and a plurality of sub-carriers, the apparatus comprising:

a channel estimator, coupled to the receive antennas, to determine some or all of the sub-carriers as referenced sub-carriers and generate a channel matrix of each of a plurality of channels in response to each of the referenced sub-carriers, wherein each of the channels is formed between the transmit antennas and a group of at least two of the receive antennas; and an antenna selector, coupled to the channel estimator and the receive antennas; comprising:

a calculation logic for generating a parameter of transmission capacity for each of the channels in response to each of the referenced sub-carriers according to the corresponding channel matrix; and a selection logic for selecting one of the channels and the corresponding group of at least two of the receive antennas according to the plurality of parameters of transmission capacity.

13. The apparatus of claim 12, wherein the calculation logic generates the parameter of transmission capacity according to a determinant det(H'H), wherein H is the channel matrix of the channel in response to the referenced sub-carrier, and H' is a Hermitian matrix of H.

14. The apparatus of claim 13, wherein the selection logic selects the channel according to a sum of the parameter of transmission capacity for each of the channels in response to each of the referenced sub-carriers.

15. The apparatus of claim 14, wherein the channel with a maximum sum of the parameter of transmission capacity of each of the referenced sub-carriers is selected.

16. The apparatus of claim 13, wherein the selection logic selects the channel according to a sum of a reciprocal of the parameter of transmission capacity for each of the channels in response to each of the referenced sub-carriers.

17. The apparatus of claim 16, wherein the channel with a minimum sum of a reciprocal of the parameter of transmission capacity of each of the referenced sub-carriers is selected.

18. The apparatus of claim 12, wherein the calculation logic generates the parameter of transmission capacity according to a determinant det(H) when a number of the transmit antennas is identical to a number of the receive antennas in the group of at least two of the receive antennas, wherein H is the channel matrix of the channel in response to the referenced sub-carrier.

19. The apparatus of claim 12, wherein the referenced sub-carriers include one of every a plurality of adjacent ones of the sub-carriers.

20. The apparatus of claim 12, wherein if the transmit antennas transmit a plurality of preamble sequences at the sub-carriers in a tone-interleaved manner, the channel estimator starts to generate the channel matrix when the receive antennas receive a first preamble sequence at each of the sub-carriers.

21. The apparatus of claim 20, wherein a matrix element corresponding to each receive antenna in the corresponding group of at least two of the receive antennas of each of the channels is generated according to the first preamble sequence received by the receive antenna at the referenced sub-carrier or other sub-carrier neighboring to the referenced sub-carrier.

22. The apparatus of claim 12, wherein the multi-carrier system is an Orthogonal Frequency Division Multiplexing (OFDM) system.

* * * * *